United States Patent [19]

Perret-Gentil

[11] Patent Number: 4,723,771

[45] Date of Patent: Feb. 9, 1988

[54] FIXING AND JAMMING TOOLING FOR ROUND PARTS

[76] Inventor: Gaston R. Perret-Gentil, 13 rue Gautier, Geneve, Switzerland, 1201

[21] Appl. No.: 796,027

[22] PCT Filed: Apr. 3, 1984

[86] PCT No.: PCT/CH84/00054

§ 371 Date: Oct. 21, 1985

§ 102(e) Date: Oct. 21, 1985

[87] PCT Pub. No.: WO85/00771

PCT Pub. Date: Feb. 28, 1985

[30] Foreign Application Priority Data

May 3, 1984 [CH] Switzerland .................. 1065/84

[51] Int. Cl.⁴ .............................................. B25B 1/10
[52] U.S. Cl. ...................................... 269/246; 269/902
[58] Field of Search ............... 269/902, 240, 246, 156, 269/237

[56] References Cited

U.S. PATENT DOCUMENTS

| | | | |
|---|---|---|---|
| 1,845,438 | 2/1932 | Parkhurst | 269/156 X |
| 2,024,112 | 12/1935 | Phillis | 269/237 X |
| 2,108,077 | 2/1938 | Robinson | 269/902 X |
| 2,364,150 | 12/1944 | Lowenstein | 269/902 X |
| 2,455,024 | 11/1948 | Schneider | 269/902 X |
| 2,823,564 | 2/1958 | Lentino et al. | |
| 3,218,059 | 11/1965 | Andrew | 269/902 X |
| 3,971,552 | 7/1976 | Mayfield | 269/902 X |

FOREIGN PATENT DOCUMENTS

| | | |
|---|---|---|
| 2296487 | 7/1976 | France . |
| 2426540 | 1/1980 | France ............................. 269/156 |
| 326021 | 3/1930 | United Kingdom . |
| 590005 | 7/1947 | United Kingdom . |

Primary Examiner—Frederick R. Schmidt
Assistant Examiner—Judy J. Hartman
Attorney, Agent, or Firm—Wood, Dalton, Phillips, Mason & Rowe

[57] ABSTRACT

The fixing and guiding tooling for round parts comprises a clamping base (12) provided with inclined planes (1,2) cooperating with a clamping device which tilts and slides into an opening-guide (7) arranged so as to be capable of securing a certain number of parts (13) of different diameter and shape without modifying their axial positions with respect to the base; the clamping base may be coupled with a guiding tooling intended to maintain the round parts clamped and to guide the tools used for the mechanical operations carried out on the secured round parts.

11 Claims, 4 Drawing Figures

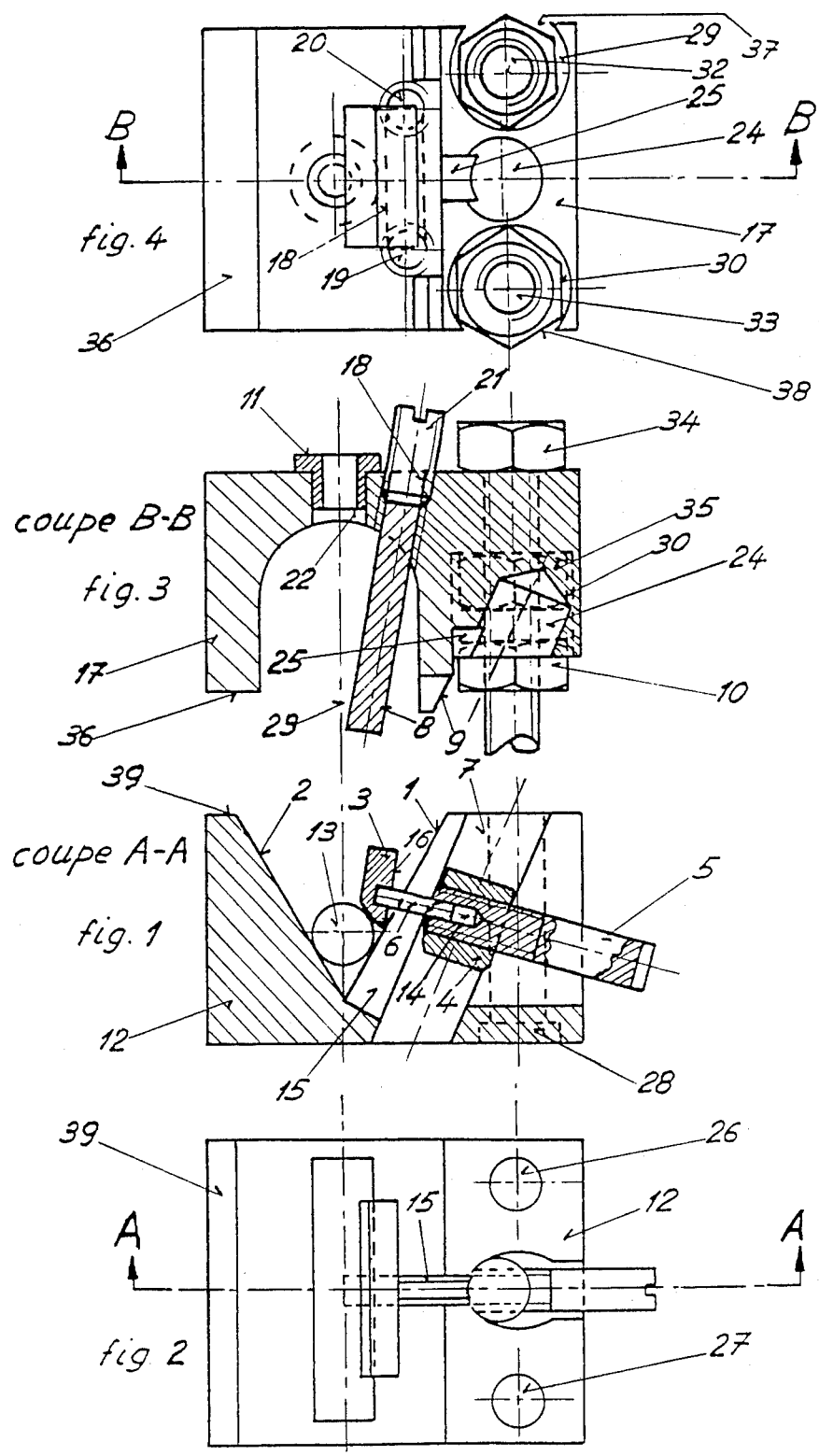

FIXING AND JAMMING TOOLING FOR ROUND PARTS

We know fixing guiding toolings for round parts which are usually comprised of a prismatic flange bearing against the upper section of the part to tighten, using a union bow which covers the supporting levels of the part. These toolings exhibit the following disadvantages: (1) They do not allow fixing small diameter parts further to a preliminary contact of the flange on the supporting levels before the flange can touch the upper section of the part. (2) Screwing into the flange according to the tightening of very different diameters takes up relatively long. (3) A tightening flange covering the upper section of the part to tighten does not make it accessible over its whole length. (4) An additional device to transform it, for example into a drilling jig, does not exist. To this end, the fixing and guiding tooling is laid out as defined by the patent claims 1 and 4.

A version of the tooling subject to the said invention will be described on the enclosed drawing, as an example, the FIG. 1 showing an axial section and the FIG. 2 a view from above a fixing tooling for round parts, the figure 3 an axial section and the FIG. 4 a view from underneath a guiding tooling for round parts. This description, starting from the fixing tooling on its own, is comprised of a base 12 (FIG. 1) fitted with two inclined planes 1 and 2 carrying the part to tighten 13, a cylindrical aperture 7 inside which the swivelled nut 4 can slide quite freely. The nut 4 is assembled with a tightening screw 5 which has a spherical end to lean against the wall of the aperture 7 which is closest to the plane 1 (FIGS. 1 and 2). The screw 5 bears an arm 6 sliding freely inside a cylinder 14 recessed in the axle of the screw 5. The assembly formed by the arm 6 and its dependent tightening block 3 collides through the relief 15 inside the base 12 between its upper edge and a section opened over the whole length of the surface of the inclined plane 1 corresponding (FIGS. 1 and 2). Moreover, two clearance holes are drilled through 26 and 27 into the body of the base 12, fitted with a counterbore similar to 28.

The operation is as follows: when you want to lock a round part such as 13, but which can also have a smaller or larger diameter inscribable in the triangle constituted by the complete section limited by the inclined planes 1 and 2 inside the base 12, this very lock being necessary to carry out operations such as tack welding, drilling, milling, grinding, control of the surface or of the inside of the parts, you will communicate a motion of rotation to the right of the right-threaded screw 5, this motion brings the screw 5 towards the inclined plane 1 since the nut 4 cannot turn around. Before the screw 5 moving towards the relief 15, the axis of the nut 4 carrying this screw will be almost the same as that of the aperture 7, in this position, not illustrated, the block 3, bearing upon the part 13, has a face 16 forming an angle with the plane 1 smaller than in the position illustrated. As soon as the spherical end of the rotating screw 5 reaches the lateral surface of the guiding aperture 7 (FIG. 1), the lateral surface of the nut 4 does not coincide any more with that of the aperture 7 but is now in the slanting position illustrated which brings about the tilting-over of the arm 6 carrying the block 3 maintaining the part 13 between the lanes 1 and 2 as well as its contact face with the part; furthermore, the block 3 slides along the plane 1 moving its arm inside the cylinder 14. The part 13 is then locked. To loosen the part 13, you just need to turn the screw 5 in the other direction. To tighten a part of a different size, you have to displace the tightening 3 to bring it slightly against the part along its supporting plane while sliding the nut 4 through the aperture 7, then you proceed in the same way as in the example described for the part 13. The part to lock could also be conical; in this case, the block 3 will bear against the conical surface while rotating together with its arm 6 around its very axis. For practical reasons, longitudinal positioning stops can also be mounted, not illustrated, for series operations on similar parts or you can insert two parallel supporting plates, of the same thickness, between the planes 1 and 2 and the part to lock in order to recess an additional space beneath the part for large diameter clearing drills.

If you cannot but resort to a guiding gun, for instance for repetitive drillings, you can assemble the base 12 of the fixing tooling with the guiding tooling (FIG. 3 and FIG. 4), a version of which, carried out within the framework of the aforesaid invention, will be described additionally to that of the fixing tooling as an example.

The guiding tooling comprises a support 17 in which a slanting sliding rail 18 is recessed, its both ends are fitted with two threaded holes 19 and 20, their diameters being larger than the width of this sliding rail, the lateral faces of these holes reaching into the sliding rail. This sliding rail comprises a blocking unit 8 of which the edges are in contact with both ends of these two threaded holes coming out of both sides of the support (FIG. 3 and FIG. 4). The threaded holes 19 and 20 are fitted with two supporting screws similar to the screw 21. A swivelled hole, on a perpendicular axis 23 with respect to the support 17, receives a guiding gun 11. The angle comprised between the tilting axis of the sliding rail 18 and that of the axis 23 is almost the same as the angle formed by the face 16 of the block 3 (FIG. 1) with this very axis.

The lower section of the support body contains an inclined sparing 24 (FIG. 3 and FIG. 4) of which the tilting angle is almost equal to that of the guiding aperture 7 with the axis 23 (FIG. 1). A hollow space is recessed in the prolongation of the sparing 24, in the body of the support 17 (FIG. 3 and FIG. 4).

Two assembly holes fitted with two identical counterbores 29 and 30 are drilled at both ends of this support 17, through its body. These holes comprise two bolts 32 and 33 similar to 34. These bolts carry two fixing nuts to the support such as 35 and two adjusting nuts such as 10.

The base 12 is assembled with the support 17 (FIG. 1 and FIG. 3) as follows: you check that the lower supporting plane of the two adjusting nuts 10 is level with the contact plane 36 (FIG. 3). Failing which, you have to screw or loosen the adjusting nuts while using notches or driving holes, not illustrated, situated in the lateral surface of these nuts and accessible through the windows 37 and 38 drilled through the support 17 on top of the counterbores 29 and 30.

After levelling the nuts 10, you insert the threaded rods of the bolts 32 and 33 (FIG. 3 and FIG. 4) inside the two clearance holes 26 and 27 of the base 12 (FIG. 2 and FIG. 3) while bringing the support 17 of the base 12 (FIG. 1 and FIG. 3) into contact between the planes 36 and 39, so that the inclined surface 9 coincides simultaneously with the plane 1. In this position, the axis 23 is common to the gun 11 and the part 13 (FIGS. 1 and 3). Then you check that the additional blocking unit 8 is not touching the upper section of the block 3 yet.

Thus, in brief recapitulation, as shown in the drawing as filed the invention is directed to a work holder for holding workpieces having a rounded surface portion such as cylindrical or conical workpieces. The work holder includes a base 12 having an upper surface 39 having an upwardly widening V-section work receiving recess having a lower apex and being defined by intersecting planar surfaces 1 and 2. A clamping block 3 having a lower portion defining a work engaging surface is provided for urging the workpiece 13 into positively retained association with the base.

The clamping block is urged against the workpiece by adjustable means including a nut 4 and a screw 5 with the clamping block 3 being connected to the screw by a connector 6 which is slidably received in a cylindrical recess 14 in the distal end of the screw 5. Nut 4 includes a forward segmentally spherical surface engaging the surface of a cylindrical bore 7 having an inwardly opening slot 15 through which the screw extension 6 extends.

As the screw 5 is threaded through the nut, the inclination of the cylindrical surface 7 urges the nut downwardly carrying with it the clamping block which has its lowermost edge slidably engaging the planar surface 1 at opposite edges of the slot 15. Engagement of the spherical nut with the base at the inner portion of the bore 7 causes the nut to tilt in the bore in a counterclockwise direction as seen in FIG. 1 and thereby correspondingly tilt the clamping block to cause the lower surface thereof to face more directly toward the apex of the V slot, while at the same time the clamping block is urged forcibly downwardly against the workpiece 13 to retain the workpiece in the slot. At this time, the extension 6 slides in the axial recess 5 to accommodate the new relationship between the clamping block and nut.

As shown in FIG. 1, the workpiece 13 may have any of different configurations of rounded surfaces such as spherical, cylindrical, and conical, the segmentally spherical nut permitting accommodation of the work engaging surface of the clamping block to any of the different rounded configurations. Thus illustratively, the clamping block may have point contact with spherical workpieces and line contact with both cylindrical and conical workpieces.

Alternatively, the clamping block may be urged against the workpiece by means of the element 8 shown in FIG. 3 carried by an upper support 17 secured to the lower support by suitable bolt 34. As can be seen by consideration of the structure illustrated in FIGS. 1 and 3, the element 8 effectively urges the clamping block 3 to a clamping disposition similar to that which is urged by the screw 5/nut 4 adjusting means.

The work holder of the present invention is extremely simple and economical of construction while yet providing the highly desirable features discussed above.

Afterwards, you assemble the support 17 with the base 12 rigidly while tightening the counternut, not illustrated, housed inside the counterbores. You press the unit 8 against the block 3, more or less hard, according to the conditions claimed for, using the two screws 21; the width of this unit was initially made large enough to enable pressing the block in all operating conditions adapted to the tooling. The sparing 24 is designed for letting the nut 4 slide freely and the hollow space for letting the arm 6 clear through.

The whole fixing and guiding tooling for round parts being now completed, you can slide the assembly by the base 12 onto a chucking table in order to place the axis 23 of the gun in the axis of the tool having to perform the mechanical operations either while maintaining the assembly manually or flanging to the chucking table using fastening hooks, not illustrated, shown by the base 12; or you can insert the two threaded rods of the bolts 32 and 33 through grooves or clearance holes of the chucking table and tighten the assembly to this table while using washers and supporting nuts, not illustrated, mounted at the end of these threaded rods and to be tightened from underneath the chucking table.

BRIEF DESCRIPTION OF THE DRAWINGS

FIG. 1 is a vertical section taken along the line A—A of FIG. 2;

FIG. 2 is a top plan view of a base portion of a workholder embodying the invention;

FIG. 3 is a vertical section taken along the line B—B of FIG. 4; and

FIG. 4 is a bottom plan view of a modified form of structure for urging a clamping block against a workpiece on the base portion.

Thus, in brief recapitulation, as shown in the drawing as filed the invention is directed to a work holder for holding workpieces having a rounded surface portion such as cylindrical or conical workpieces. The work holder includes a base 12 having an upper surface 39 having an upwardly widening V-section work receiving recess having a lower apex and being defined by intersecting planar surfaces 1 and 2. A clamping block 3 having a lower portion defining a work engaging surface is provided for urging the workpiece 13 into positively retained association wth the base.

The clamping block is urged against the workpiece by adjustable means including a nut 4 and a screw 5 with the clamping block 3 being connected to the screw by a connector 6 which is slidably received in a cylindrical recess 14 in the distal end of the screw 5. Nut 4 includes a forward segmentally spherical surface engaging the surface of a cylindrical bore 7 having an inwardly opening slot 15 through while the screw extension 6 extends.

As the screw 5 is threaded through the nut, the inclination of the cylindrical surface 7 urges the nut downwardly carrying with it the clamping block which has its lowermost edge slidably engaging the planar surface 1 at opposite edges of the slot 15. Engagement of the spherical nut with the base at the inner portion of the bore 7 causes the nut to tilt in the bore in a counterclockwise direction as seen in FIG. 1 and thereby correspondingly tilt the clamping block to cause the lower surface thereof to face more directly toward the apex of the V slot, while at the same time the clamping block is urged forcibly downwardly against the workpiece 13 to retain the workpiece in the slot. At this time, the extension 6 slides in the axial recess 5 to accommodate the new relationship between the clamping block and nut.

As shown in FIG. 1, the workpiece 13 may have any of different configurations of rounded surfaces such as spherical, cylindrical, and conical, the segmentally spherical nut permitting accommodation of the work engaging surface of the clamping block to any of the different rounded configurations. Thus illustratively, the clamping block may have point contact with spherical workpieces and line contact with both cylindrical and conical workpieces.

Alternatively, the clamping block may be urged against the workpiece by means of the element 8 shown in FIG. 3 carried by an upper support 17 secured to the lower support by suitable bolt 34. As can be seen by consideration of the structure illustrated in FIGS. 1 and 3, the element 8 effectively urges the clamping block 3 to a clamping disposition similar to that which is urged by the screw 5/nut 4 adjusting means.

The work holder of the present invention is extremely simple and economical of construction while yet providing the highly desirable features discussed above.

I claim:

1. A work holder for holding a workpiece having a rounded surface portion, said work holder comprising:
   a base having an upper surface having an upwardly widening V-section work receiving recess having a lower apex defined by intersecting first and second planar surfaces;
   a clamping block having a portion defining a work engaging surface; and
   adjustable means carried by said base for sliding said portion of the block downwardly along said first surface of the work receiving recess to forcibly urge said work engaging surface of the block toward said recess apex and concurrently tilt the block to cause said work engaging surface thereof to turn facially toward said apex, whereby a workpiece having a round surface portion engaged by said surface is urged by said clamping block into positively held relationship with said base in said recess.

2. The work holder of claim 1 wherein said adjustable means includes means for permitting three-dimensional tilting of said block whereby said work engaging surface may have extended engagements selectively with conically and cylindrically rounded portions of workpieces.

3. The work holder of claim 1 wherein said clamping block defines an edge of said work engaging surface slidably engaging said first planar surface, and said adjustable means includes means for tilting said clamping block about said edge.

4. The work holder of claim 1 wherein said base defines a guide surface and said adjusting means includes means slidable against said guide surface for concurrently sliding and tilting said clamping block.

5. The work holder of claim 1 wherein said base defines a guide surface and said adjusting means includes a nut slidably engaging said guide surface, a screw threaded to said nut, and means associated with said screw for carrying said clamping block.

6. The work holder of claim 1 wherein said base defines a guide surface and said adjusting means includes a nut slidably engaging said guide surface, a screw threaded to said nut, and extensible means associated with said screw for carrying said clamping block.

7. The work holder of claim 1 wherein said base defines a cylindrical guide surface and said adjusting means includes a nut having a segmentally spherical surface slidably engaging said guide surface, a screw threaded to said nut, and means associated with said screw for carrying said clamping block.

8. The work holder of claim 1 wherein said clamping block defines an end surface and said adjusting means includes means acting against said end surface substantially directly toward said work engaging surface to urge said clamping block toward said recess apex.

9. The work holder of claim 1 wherein said base defines a guide surface and said adjusting means includes a nut slidably engaging said guide surface, a screw threaded to said nut, and means associated with said screw fixedly connected to said clamping block.

10. The work holder of claim 1 wherein said base defines a guide surface and said adjusting means includes a nut slidably engaging said guide surface, a screw threaded to said nut, and means removably associated with said screw for carrying said clamping block.

11. The work holder of claim 1 wherein said adjustable means includes means for supporting said clamping block extending through said first planar surface.

* * * * *